(12) United States Patent
Oshima et al.

(10) Patent No.: US 8,828,512 B2
(45) Date of Patent: Sep. 9, 2014

(54) LAMINATED METAL SHEET FOR TWO-PIECE CAN BODY AND TWO-PIECE LAMINATED CAN BODY

(75) Inventors: Yasuhide Oshima, Chiba (JP); Masaki Tada, Fukuyama (JP); Hiroki Iwasa, Kawasaki (JP); Katsumi Kojima, Fukuyama (JP); Yoichiro Yamanaka, Fukuyama (JP); Yoshihiko Yasue, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 54 days.

(21) Appl. No.: 12/812,692

(22) PCT Filed: Feb. 5, 2009

(86) PCT No.: PCT/JP2009/052346
§ 371 (c)(1),
(2), (4) Date: Aug. 23, 2010

(87) PCT Pub. No.: WO2009/099246
PCT Pub. Date: Aug. 13, 2009

(65) Prior Publication Data
US 2010/0310824 A1   Dec. 9, 2010

(30) Foreign Application Priority Data

Feb. 7, 2008  (JP) .................................. 2008-027530

(51) Int. Cl.
*B32B 27/36*   (2006.01)

(52) U.S. Cl.
CPC ...................................... *B32B 27/36* (2013.01)
USPC .......... 428/35.8; 428/626; 428/457; 428/458; 428/141

(58) Field of Classification Search
CPC ..................................................... B32B 27/36
USPC .................. 428/35.7, 457, 458, 626
See application file for complete search history.

(56) References Cited

U.S. PATENT DOCUMENTS

| | | | |
|---|---|---|---|
| 6,277,455 B1 | 8/2001 | Shimizu et al. | |
| 6,309,720 B1 | 10/2001 | Shimizu et al. | |
| 6,780,482 B2 * | 8/2004 | Majima et al. | 428/35.8 |
| 2005/0238845 A1 * | 10/2005 | Kuroda et al. | 428/141 |

FOREIGN PATENT DOCUMENTS

| | | | |
|---|---|---|---|
| EP | 1288261 | | 3/2003 |
| EP | 1449884 A1 * | | 8/2004 |
| JP | 11-254626 | | 9/1999 |
| JP | 2000-313755 | | 11/2000 |
| JP | 2004-058402 A | | 2/2004 |
| JP | 2005-144728 | | 6/2005 |
| JP | 2005-161785 A | | 6/2005 |
| JP | 2005-305701 | | 11/2005 |

OTHER PUBLICATIONS

International Search Report, PCT/JP2009/052346, May 26, 2009.
European Search Report—EP 09 70 9190—Nov. 23, 2012.
Japanese Office Action dated Feb. 27, 2012; Application No. 2008-027530.

* cited by examiner

*Primary Examiner* — Michele L Jacobson
(74) *Attorney, Agent, or Firm* — Young & Thompson

(57) ABSTRACT

There is provided a laminated metal sheet used for making a highly processed two-piece can body which endures harsh conditions such as retort treatment, and a two-piece can body made of the laminated steel sheet. A laminated metal sheet for a two-piece can body, including a metal sheet having a polyester resin film layer on each side of the metal sheet, the polyester resin film layer to be the outside of the can body having a crystallization temperature of 60 to 100° C., and the surface of the polyester resin film layer having a center line surface roughness (Ra) of 0.2 to 1.8 µm. The polyester resin film layer to be the outside of the can body is preferably composed of 40 to 100% by mass of a resin composed mainly of butylene terephthalate and 0 to 60% by mass of a resin composed mainly of ethylene terephthalate.

16 Claims, No Drawings

LAMINATED METAL SHEET FOR TWO-PIECE CAN BODY AND TWO-PIECE LAMINATED CAN BODY

TECHNICAL FIELD

The present invention relates to a laminated metal sheet for a two-piece can body and a two-piece can body made of the laminated steel sheet, and specifically to a laminated metal sheet used for making a highly processed two-piece can body for foods, such as a drawn and ironed (DI) can, which may be exposed to harsh conditions such as retort treatment, and a two-piece can body made of the laminated steel sheet.

BACKGROUND ART

A DI can is a two-piece can having no joint between the trunk and wall, and is produced by drawing (cupping) a metal sheet to form a cup, followed by ironing, or redrawing and ironing. DI cans are used for packing beverages such as beer and soft drinks, and foods such as soups and vegetables.

In the drawing operation, a disk stamped out from a metal sheet is held by a blank holder in a drawing machine called cupping press, and formed into a cup with a tool composed of a punch and a die. In the ironing operation, the side wall of the drawn cup is stretched into a thin section.

In the drawing operation, if the diameter of the disk-shaped metal sheet is too larger than the diameter of the ironing punch, a cup having a desired shape may be not formed by one time of the drawing operation. In this case, the drawing operation is usually carried out twice (drawing-redrawing) thereby forming a desired shape. Through the operations, a cup having a relatively larger diameter is produced by the cupping press, the cup is redrawn in a body maker (can body former), and then ironed.

DI cans are usually made of a metal sheet such as a tin-plate or aluminum sheet. The metal sheet is formed into a desired shape by the DI forming, and subjected to aftertreatment such as washing, surface treatment, and coating, thus producing a DI can. In recent years, with the aim of omitting or simplifying the aftertreatment, a method for producing a DI can from a film-laminated metal sheet (hereinafter may be referred to as a laminated metal sheet) is studied thereby producing a can without aftertreatment.

When a film-laminated metal sheet is formed into a two-piece can body by the DI forming, the film must have very high processability so as not to be perforated or peeled from the metal substrate during ironing. Further, when the laminated metal sheet is formed into a two-piece can body for packing a food, the can body will be exposed to harsh conditions such as retort treatment. Therefore, the film must have durability after a high level of processing.

As described above, when a laminated metal sheet is formed by the DI forming into a two-piece can body for packing a food, the film must have very high processability and durability. Although studies have been made on laminated metal sheets for making DI cans for beverages used in moderate environments, there has been no laminated metal sheet resistant to high levels of processing and harsh conditions.

For example, Patent Documents 1 to 4 describe coating films for metal sheets. The films, which are composed of butylene terephthalate and ethylene terephthalate, are laminated principally to aluminum sheets, and subjected to drawing and ironing. However, the smooth laminated metal sheets described in Patent Document 1 to 4 tend to have film defects or deteriorate in their adhesion to the metal substrates during the DI forming, and thus likely cannot endure harsh conditions such as retort treatment when used to make a food can. In particular, when the substrate is a steel sheet having a higher strength than an aluminum sheet, the coating film tends to be damaged during forming, and thus may be unserviceable under harsh conditions.

Patent Document 1: Japanese Unexamined Patent Application Publication No. 2002-88233
Patent Document 2: Japanese Unexamined Patent Application Publication No. 2001-335682
Patent Document 3: Japanese Unexamined Patent Application Publication No. 2004-58402
Patent Document 4: Japanese Unexamined Patent Application Publication No. 2004-249705

That is to say, there has been no method for making a highly processed two-piece can body such as a DI can from a laminated metal sheet with durability to harsh conditions such as retort treatment.

The present invention has been made in view of the above circumstances, and is intended to provide a laminated metal sheet suitable for making a highly processed two-piece can body resistant to harsh conditions such as retort treatment, and a two-piece can body made of the laminated steel sheet.

DISCLOSURE OF INVENTION

During processing of a highly processed two-piece can, the resin layer must have processability conformable to a high level of processing.

Although many resin compositions with high processability have been studied, there are few studies from the viewpoint of the shape of the resin surface. In order to increase the number of the bumps on the resin surface thereby improving processability, attempts have been made to add small particles such as silica particles, which are usually called a lubricant, to a resin layer to form fine bumps on the resin surface, thereby reducing the surface friction with a processing die to improve the processability.

Although large surface bumps can be formed through the increase of the size or amount of the lubricant, this tends to result in film defects or ruptures during stretching of the molten resin under cooling in the film manufacturing process.

The inventors found that large bumps can be formed on a surface of a smooth resin film during lamination of the film using a lamination roll, and further discussed the finding. Consequently, the inventors have found that the processability of a film is markedly improved through the formation of large bumps on the resin film surface.

Details about the invention are described below.

In the drawing and ironing operations, the film surface to be the outside of a can body is ironed by a tool thereby stretching the film. Therefore, the formability of the film is markedly improved by the reduction of the frictional resistance of the film to be the outside of the can body. Common lubricants used for reducing the surface friction with a processing die have a size of 1 µm or less. Such a lubricant forms very fine surface bumps on a resin layer. On the other hand, under the method of forming bumps on a resin film surface using a lamination roll, bumps having a shape corresponding to the surface shape of the lamination roll are formed under the control of the surface shape of the lamination roll, and temperature and pressure during lamination.

For example, when a rubber roll having a center line surface roughness (Ra) of 0.5 µm is used for lamination under appropriate conditions, bumps having a center line surface roughness of 0.2 to 1.8 µm are formed on the resin film surface. As a result of this, the surface friction markedly decreases and the processing stress also decreases, which result in marked improvement of the processability. A laminated metal sheet having such surface shape scarcely causes peeling or rupture of the film even during a high level of forming process such as the DI forming. In addition, the formed film is so adhesive that it scarcely causes defects such as peeling when exposed to harsh conditions such as retort treatment. Further, the internal stress of the film caused by the forming process is relaxed by heat treatment carried out after the forming process, which results in further improvement of the film adhesion. It has been thus found that the forming process is preferably followed by heat treatment.

The present invention has been accomplished on the basis of the findings, and the aspects thereof are described below.

[1] A laminated metal sheet for a two-piece can body, including a metal sheet having a polyester resin film layer on each side of the metal sheet, the polyester resin film layer to be the outside of the can body having a crystallization temperature of 60 to 100° C., and the surface of the polyester resin film layer having a center line surface roughness (Ra) of 0.2 to 1.8 μm.

[2] The laminated metal sheet for a two-piece can body according to [1], wherein the polyester resin film layer to be the outside of the can body is composed of 40 to 100% by mass of a resin composed mainly of butylene terephthalate and 0 to 60% by mass of a resin composed mainly of ethylene terephthalate.

[3] The laminated metal sheet for a two-piece can body according to [1] or [2], wherein the film layer surface to be the inside of the can body has a center line surface roughness (Ra) of 0.2 to 1.8 μm.

[4] The laminated metal sheet for a two-piece can body according to any one of [1] to [3], which is produced through drawing and ironing.

[5] The laminated metal sheet for a two-piece can body according to [4], which is produced through heat treatment at a temperature of 150° C. to 220° C. during and/or after the drawing and ironing.

BEST MODE FOR CARRYING OUT THE INVENTION

The present invention is further described below.

The present invention relates to a two-piece can, and is suitable for, in particular, a highly processed two-piece can such as a DI can.

The metal sheet used as the substrate of the laminated metal sheet of the present invention is described below.

The metal sheet as the substrate may be an aluminum material, but is preferably a steel sheet with a better cost efficiency than an aluminum plate. Examples of preferred steel sheets include common tin-free steel sheets and tinplates. The tin-free steel plate preferably has on its surface a metal chromium layer in a coating weight of 50 to 200 mg/m$^2$, and a chromium oxide layer in a coating weight of 3 to 30 mg/m$^2$ in terms of metal chromium. The tinplate preferably has a tin coating quantity of 0.5 to 15 g/m$^2$. The plate thickness is not particularly limited, but is preferably from 0.15 to 0.30 mm.

The resin layer composing the laminated metal sheet of the present invention is described below.

In principle, the resin layer composing the laminated metal sheet of the present invention is a polyester resin in consideration of processability, durability, and food safety. A polyester resin film (hereinafter may be referred to simply as a film) has high mechanical strength, provides a low coefficient of friction and good lubricity, serves as a good barrier against gases and liquids, and is low-cost. Accordingly, it endures a high level of forming such as the DI forming wherein the film is extended as high as 300%, and the film is robust even after forming.

Further, when the laminated metal sheet is used to make a food can which is usually subjected to retort treatment, the laminated metal sheet must have durability under such harsh retort conditions. Under the retort conditions, the temperature of the laminated metal sheet quickly increases to about 120 to 130° C. as exposed to high temperature vapor. Under such high temperature conditions, a crystallized film resin is scarcely deteriorated because the film is resistant to penetration of the vapor, while a film containing much amorphous components is deteriorated because it is very vulnerable to vapor penetration. In particular, the outside film is directly exposed to high temperature vapor, and thus can be readily deteriorated, and becomes cloudy to lose transparency, which results in the impairment of the appearance.

The polyester resin film layer of the laminated metal sheet to be subjected to the DI forming contains more amorphous components than crystalline components having poor processability thereby keeping adequate processability. Therefore, the resin film layer can be readily deteriorated during retort treatment of the can made of the laminated metal sheet.

Therefore, in the present invention, the film has a structure susceptible to crystallization. The film is crystallized during the temperature rise immediately after the initiation of retort treatment thereby preventing the degradation caused by the retort treatment. In order to achieve the retort resistance, the crystallization temperature of the film resin after lamination must be from 60 to 100° C. Therefore, in the laminated metal sheet of the present invention, the crystallization temperature of the polyester resin to be at least the outside of a can body is from 60 to 100° C. If the crystallization temperature is higher than 100° C., the film degradation caused by retort treatment cannot be sufficiently prevented. On the other hand, if the crystallization temperature is below 60° C., crystallization proceeds even during the DI forming of the film to impair the processability.

The crystallization temperature of the film is determined as follows. A film peeled off from a laminated metal sheet is heated in a differential scanning calorimeter (DSC) from room temperature at a temperature rising rate of 10° C./minute, and the temperature of the exothermic peak between 100 to 200° C. in the DSC curve incident to the crystallization is recorded as the crystallization temperature.

In order to achieve a film resin crystallization temperature of 60 to 100° C., a polyester resin having a high crystallization rate is preferred, and polybutylene terephthalate, which is a resin having a particularly high crystallization rate, is more preferred. However, if polybutylene terephthalate is used alone, it crystallizes so fast that it is not suitable for a high level of processing such as the DI forming. Therefore, the resin is preferably combined with poly ethylene terephthalate.

The polyester resin composition is preferably composed of 40 to 100% by mass of a resin composed mainly of butylene terephthalate and 0 to 60% by mass of a resin composed mainly of ethylene terephthalate. The composition within the range has an appropriate crystallization temperature and provides high durability against retort treatment. If the amount of the butylene terephthalate resin is less than 40% by mass, the crystallization temperature exceeds 100° C., which may result in insufficient retort resistance. The resin composition is more preferably composed of 40 to 80% by mass of a resin composed mainly of butylene terephthalate and 20 to 60% by mass of a resin composed mainly of ethylene terephthalate.

In the present invention, the resin composed mainly of butylene terephthalate and the resin composed mainly of ethylene terephthalate may contain a dicarboxylic acid component other than terephthalic acid, and a glycol component other than ethylene glycol or butanediol, without impairing their properties. The resin composed mainly of butylene terephthalate refers to a resin containing 80 mol % or more, preferably 85 mol % or more of butylene terephthalate units, and the resin composed mainly of ethylene terephthalate refers to a resin containing 80 mol % or more, preferably 85 mol % or more of ethylene terephthalate units. Examples of the dicarboxylic acid component other than terephthalic acid include isophthalic acid, naphthalenedicarboxylic acid, oxalic acid, succinic acid, adipic acid, sebacic acid, and maleic acid. Examples of the glycol component other than ethylene glycol or butanediol include propanediol, pentanediol, hexanediol, neopentyl glycol, cyclohexane dimethanol, and bisphenol A.

When the crystallization temperature is from 60 to 100° C. with the intention of preventing the film degradation caused by retort treatment, the crystallization proceeds so quickly that the processability tends to be poor. More specifically, since crystallization of the resin film is progressed by heat and extension during the processing, the resin can be crystallized by a high level of processing to have poor processability, which results in the difficulty in accomplishing a high level of processing. Therefore, the inventors studied a method for a high level of processing such as the DI forming using a resin having low processability and a low crystallization temperature.

In the forming process of a highly processed two-piece can body, the surface friction is markedly influential during processing. In usual cases, the smaller the surface friction, the higher the processability. In particular, during the ironing operation, the film is stretched with the film surface subjected to friction. Therefore, the lower the frictional resistance, the smaller the heat quantity generated during processing, which results in easiness of processing.

In order to decrease the surface friction, commonly, bumps are formed on the resin surface thereby improving the processability. For example, fine particles are added to a resin so as to be exposed at the resin surface, thereby increasing the surface roughness to improve the processability. However, the size of acceptable fine particles is limited. Since a film containing a common lubricant has a surface roughness Ra of about 0.1 μm at most, it has little room for large surface bumps. Then, as a result of research by the inventors, it has been found that the formation of bumps during lamination on a smooth resin film containing no fine particles markedly reduces the surface friction, which results in the reduction of the processing stress and marked improvement of the processability.

Therefore, in the present invention, the center line surface roughness (hereinafter may be referred to as surface roughness) of the surface bumps of the resin layer is defined as from 0.2 μm to 1.8 μm. In usual cases, beverage cans are required to have a high glossiness, so that the surface of a laminated metal sheet used to make such a can is kept smooth. A film used to make such a high gloss laminated metal sheet usually has a surface roughness Ra of 0.1 μm or less. The film surface keeps smoothness even after lamination, and has a surface roughness of about 0.1 μm. Such a smooth laminated metal sheet tends to cause film defects or degradation of the adhesion to the substrate during the DI forming, and thus cannot be used to make food cans which can be exposed to harsh use conditions.

On the other hand, when the resin layer surface has surface roughness exceeding 0.2 μm, the contact area between the die and film during processing decreases, and thus the frictional resistance decreases to reduce the forming resistance, which results in the improvement of the processability and the adhesion between the film and substrate. Consequently, the laminated metal sheet is useful for making food cans which can be exposed to harsh use conditions. It has been also found that the higher the surface roughness, the better the processability, and the higher the durability. The surface roughness is more preferably 0.4 μm or more. If the surface roughness exceeds 1.8 μm, the film has a nonuniform thickness, which tends to result in film defects. Therefore, the upper limit of the surface roughness is defined as 1.8 μm, and is more preferably 1.0 μm or less.

The surface roughness of the resin layer (film) can be controlled by changing the surface shape of the lamination roll, and the temperature and pressure during lamination. The surface roughness of the resin layer increases as the surface roughness of the lamination roll and the temperature and pressure during lamination increase. In particular, the lamination temperature is markedly influential, so that the surface roughness of the resin layer increases when the lamination temperature is near the melting point of the resin film. In addition, the surface roughness increases as the surface temperature of the lamination roll increases.

When the surface roughness of the resin film is controlled by the lamination temperature, the lamination temperature is preferably in the range of (resin melting point−8° C.) to (resin melting point+12° C.). If the lamination temperature is below the (resin melting point−8° C.), the surface roughness is insufficient, and if higher than the (resin melting point+12° C.), the surface is too rough and the film has a nonuniform thickness, which tend to result in film defects and sticking of molten resin film to the lamination roll.

The surface of a resin film layer having the above-described surface roughness is a mat surface with a low glossiness. In consideration of this, the surface preferably has a 60 degree glossiness of 30 to 100. The lower the glossiness, the higher the surface roughness and processability, but a glossiness lower than 30 may result in excessive surface roughness and uneven film thickness. The glossiness is preferably 50 or more. On the other hand, if the glossiness is higher than 100, the surface roughness is small and the improvement of processability may not be expected.

The inside polyester resin layer may be the same as the outside resin layer. However, since the inside will not be directly exposed to high temperature vapor during retort treatment, it may be composed of a resin having a lower crystallization temperature than that used for the outside, and may have processability enough to endure the DI forming. From this viewpoint, a poly ethylene terephthalate resin cannot provide adequate processability conformable to the DI forming. Therefore, the resin is preferably a copolymer polyester resin composed mainly of terephthalic acid and ethylene glycol, the resin containing, as the copolymerization component, from 5 to 15 mol % of an isophthalic acid component or cyclohexane dimethanol thereby striking a balance between processability and durability.

When the proportion of the copolymerization component is low, the molecules are readily oriented, which tends to result in film peeling or cracks (ruptures) parallel to the can height direction high during a high level of processing. The orientation proceeds also during the heat treatment of the processed can body. In order to avoid the problem, in the present invention, the preferred lower limit of the copolymerization component content is defined as 5 mol %. From the viewpoint of difficulty in orientation, the proportion of the copolymerization component is preferably higher. However, if the proportion exceeds 15 mol %, the cost of the film increases to deteriorate the cost efficiency, and the film becomes so soft that it may have poor scratch resistance and chemical resistance. Accordingly, the preferred upper limit of the copolymerization component content is defined as 15 mol %.

Also for the film layer to be the inside of the can body, from the viewpoint of processability, the center line surface roughness (Ra) is preferably from 0.2 to 1.8 µm as is the case with the outside. The increase of the surface roughness in the same manner as the outside further improves the processability. The reason for the definition of the preferred upper and lower limits is the same as that for the outside.

Further, the orientated state of the resin layer of the laminated metal sheet is also important for the resin layer to conform to the forming of a highly processed two-piece can body to which the present invention is applicable. A film produced by biaxial stretching is orientated in a plane in the stretched direction. If the degree of orientation is high after lamination, the film cannot conform to the processing, and may be ruptured. From this viewpoint, the plane orientation factor is preferably 0.04 or less. In order to make a desired laminated metal sheet using a biaxial oriented film having a plane orientation factor of 0.08 to 0.15, the temperature during lamination is thoroughly increased thereby fusing the orientated crystals. A film produced by extrusion is substantially non-oriented, so that is preferred from the above-described viewpoint. In addition, direct lamination for laminating a molten resin directly to a metal sheet is preferred for the same reason.

The polyester resin layer included in the laminated metal sheet of the present invention may contain additives such as pigments, lubricants, antioxidants, heat stabilizers, plasticizers, antistatic agents, lubricants, and crystal nucleating agents. In addition, a resin layer having other function may be provided over or under the polyester resin layer defined in the present invention. For example, a coating of an epoxy resin, a silicone resin, or an amorphous polyester resin may be applied under the inside and outside polyester resin layers thereby improving the wet adhesion between the polyester resin and the metal substrate.

When the resin layer has a small thickness, it tends to be impaired during processing. However, the resin layer defined in the present invention may have a small thickness to achieve a favorable result. The resin thickness may be appropriately selected according to the degree of processing and other required properties. For example, the thickness is preferably from 5 µm to 50 µm, and particularly 30 µm or less to fully derive the advantages of the present invention.

The laminated metal sheet of the present invention is illustrated below.

The laminated metal sheet of the present invention has the above-described polyester resin layer on each side of the metal sheet. The method for laminating the resin to the metal sheet is not particularly limited, and may be selected from appropriate methods such as biaxial drawing, thermocompression bonding for thermally bonding a non-oriented film under pressure, and extrusion for forming a resin layer directly on a metal sheet using a T die. These methods are known to be sufficiently effective.

The DI forming according to the present invention may use a commercial cupping press and a commercial DI forming machine, where the difference in specifications will not cause the difference in the results. With these machines, drawing and ironing are appropriately combined thereby forming a desired shape. In the drawing operation, if the diameter of the disk-shaped metal sheet is too larger than the diameter of the ironing punch, a cup having a desired shape may be not formed by one time of the drawing operation. In this case, the drawing operation is usually carried out twice (drawing-redrawing) thereby forming a desired shape. Through the operations, a cup having a relatively larger diameter is produced by the cupping press, the cup is redrawn in a body maker (can body former), and then ironed.

The coolant for the DI forming is preferably water or an aqueous solution containing components with high levels of food safety. Such coolant can be readily washed off even if it sticks to a can during cooling in the ironing (and redrawing) operation after circulation in the DI forming machine. For the purpose of lubrication during the drawing with a cupping press, it is preferred that a wax be applied to the surface of the laminated metal sheet. Application of a paraffin wax or a fatty acid ester-based wax having a melting point of 30 to 80° C. in a coating weight of 10 to 500 mg/m$^2$ provides good formability.

The can formed with the DI forming machine is preferably subjected to heat treatment after washing or without washing, thereby drying the can and improving the adhesion of the film. The temperature of the heat treatment is preferably 150° C. or higher, and more preferably 200° C. or higher. In order to prevent the deterioration of the film durability, the upper limit of the heat treatment temperature is preferably 220° C. or lower, and preferably not higher than the melting point of the resin layer.

The heat treatment relaxes the internal stress caused by processing. The relaxation of the internal stress improves the adhesion to the metal substrate. The highly processed can body described in the present invention is markedly strained in its resin layer, which tends to cause a great internal stress, and the internal stress may result in peeling of the resin layer. The heat treatment relaxes the internal stress to suppress the decrease of the adhesion, thereby preventing the peeling.

The heat treatment temperature is preferably sufficiently lower than the melting point of the polyester resin thereby facilitating the maintenance of the good appearance of the surface layer, and the prevention of sticking of the resin to surrounding objects. The upper limit of the heat treatment temperature is preferably 220° C. The lower limit of the heat treatment temperature is defined in consideration of the efficiency of the relaxation of the internal stress. The relaxation of the internal stress readily proceeds at a temperature not lower than the glass transition point (Tg) of the polyester resin. In a manufacturing processes wherein the processing time does not matter, the heat treatment temperature may be selected within a range from the glass transition point (Tg) to 150° C., but the productivity tends to deteriorate under such conditions. From this viewpoint, the lower limit of the heat treatment temperature is preferably 150° C., and more preferably 200° C. or higher and not higher than the melting point of the polyester resin.

After the heat treatment, a crystalline resin such as a polyester resin is preferably cooled as soon as possible thereby preventing crystallization which deteriorates the processability. The cooling is preferably carried out at a rate so as to cool the resin to its glass transition temperature in 10 seconds after the heat treatment.

The method for the heat treatment is not particularly limited. It has been confirmed that equal results will be achieved by, for example, an electric furnace, a gas oven, an infrared furnace, and an induction heater. The heating rate, heating time, and cooling time (the time necessary for the resin to be cooled to a temperature not higher than the glass transition point of the resin after the completion of the heat treatment) may be appropriately selected in consideration of the advantages from the relaxation of the internal stress and disadvantages from the crystallization. In usual cases, the efficiency increases as the heating rate increases. The heating time is usually from 15 seconds to 60 seconds, but the invention is not limited to the range.

In order to uniform the height of the edge, the upper portion of the formed DI can is trimmed. The trimming may be carried out before or after the washing of the can body after the DI forming, or after the heat treatment. The trimmed can body is subjected to flanging for forming a flange to which a can end is clamped, and beading for strengthening the can body, and then filled with a content.

Example 1

The examples of the present invention are described below.
"Making of Laminated Metal Sheet"
A tin-free steel sheet (metal Cr layer: 120 mg/m$^2$, Cr oxide layer: 10 mg/m$^2$ in terms of metal Cr) having a thickness of 0.20 mm a temper of T3 was used as the substrate. The substrate was subjected to film lamination (film thermocompression bonding) or direct lamination (direct extrusion) thereby forming various resin layers.

The resin films were made from resin pellets manufactured by Kanebo Gohsen, Ltd. The resins were appropriately combined so as to give the compositions listed in Table 1, and made into monolayer or two-layer co-extruded or biaxially oriented films by an ordinary method. The films having a thickness of 25 μm were individually laminated to both sides of the substrates, thus making laminated metal sheets. The center line surface roughness (Ra) of the laminated films (resin layers) was controlled by changing the surface profile of the lamination roll, and the temperature and pressure of lamination.

Film Thermocompression Bonding 1
Films made by biaxial drawing were bonded to heated metal sheets by thermocompression under a linear pressure of 80000 N/m at the lamination temperatures listed in Table 1 using a lamination roll having a center line surface roughness (Ra) of 0.6 μm, and then water-cooled in 2 seconds.

Film Thermocompression Bonding 2
Non-oriented films were bonded to heated metal sheets by thermocompression under a linear pressure of 80000 N/m at the lamination temperatures listed in Table 1 using a lamination roll having a center line surface roughness (Ra) of 0.6 μm, and then water-cooled within 2 seconds.

Direct Extrusion
The resin pellets were kneaded and molten in an extruder, and extruded through a T die so as to coat a heated metal sheet on the run. Subsequently, the resin-coated metal sheet was cooled by passing between cooling rolls at 80° C., and then water-cooled. The lamination temperatures are listed in Table 1. The center line surface roughness (Ra) of the lamination roll was 0.6 μm, and the linear pressure was 80000 N/m.

The laminated metal sheets thus obtained were measured as follows for the crystallization temperature of the laminate films, plane orientation factor, center line surface roughness (Ra), and 60 degree glossiness. The results are listed in Table 1.

"Measurement of Crystallization Temperature"
The films peeled off from laminated metal sheets were heated in a differential scanning calorimeter (DSC) from room temperature at a temperature rising rate of 10° C./minute, and the temperature of the exothermic peak between 100 to 200° C. in the DSC curve incident to the crystallization was recorded as the crystallization temperature.

"Measurement of Plane Orientation Factor"
The refraction index was measured at 25° C. using an Abbe refractometer, the sodium D line as the light source, and methylene iodide as the contact liquid. The refraction index Nx in the film length direction, the refraction index Ny in the film width direction, and the refraction index Nz in the film thickness direction were determined, and the plane orientation factor Ns was calculated according to the following formula:

Plane orientation factor($Ns$)=($Nx$+$Ny$)/2−$Nz$

"Measurement of Center Line Surface Roughness (Ra)"
According to JIS-B0601, the surface roughness was measured using a surface roughness tester SE-30 manufactured by Kosaka Laboratory Ltd., at a cutoff value of 0.8 mm, and a measuring length of 2.4 mm. The surface roughness was measured at three points in the film length and width directions, and the average Ra value was recorded as the Ra value of the film.

"Measurement of 60 Degree Glossiness"
According to JIS-Z8741, the 60 degree glossiness was measured at a measuring angle of 60 using a portable gloss meter PG-1M manufactured by Nippon Denshoku Industries Co., Ltd. The surface roughness was measured at three points in the film length and width directions, and the average glossiness was recorded as the glossiness of the film.

"Can Body Forming"
Subsequently, the laminated metal sheets obtained as described above were subjected to the DI forming under the following conditions thereby forming cans. The DI can bodies thus obtained were examined for the DI formability (robustness of the outside film of the formed can), corrosion resistance (robustness of the inside film of the can), and retort resistance by the following performance tests. The results are listed in Table 1.

"DI Forming"
The DI forming was carried out as follows. A paraffin wax having a melting point of 45° C. was applied to both sides of a laminated metal sheet in a coating weight of 50 mg/m$^2$, and then a blank having a diameter of 123 mm was stamped out. The blank was deep-drawn with a commercial cupping press to produce a cup having an inside diameter of 71 mm and a height of 36 mm. Subsequently, the cup was mounted on a commercial DI forming machine, and subjected to redrawing and three-stage ironing (reduction: 20%, 19%, and 23%, respectively) at a punch speed of 200 mm/s and a stroke of 560 mm, thereby forming a can body having an inside diameter of 52 mm and a height of 90 mm. During the DI forming, tap water was circulated at a temperature of 50° C.

The inside and outside of the can bodies produced by the DI forming were washed with a spray of ion exchange water at 50° C. for 2 minutes, and then dried in a drying furnace at 210° C. for 30 seconds, except that the washed can body of Example 6 was dried in a drying furnace at 120° C. for 30 seconds.

(1) DI Formability (Robustness of the Outside Film of the Formed Can)
The DI formability was rated on the basis of the robustness of the outside film of the formed can, provided that fewer film defects is better. A DI can after washing and drying was scratched with a file at the edge so as to pass a current through the metal sheet of the DI can, and then the DI can was placed with the bottom down in a vessel containing an electrolytic solution (1% NaCl solution, 25° C.) and having a slightly larger size than the DI can, in such a manner that only the outside of the can was exposed to the electrolytic solution. Thereafter, a voltage of 6 V was applied between the can body and the electrolytic solution, and the current value was measured and rated as follows.

(Rating)
More than 5 mA: x
More than 0.5 mA and 5 mA or less: Δ
More than 0.05 mA and 0.5 mA or less: ○
0.05 mA or less: ⊙

(2) Corrosion Resistance (Robustness of Inside of Can)

The corrosion resistance was rated on the basis of the robustness of the inside film of the can, provided that fewer film defects is better. A DI can after washing and drying was scratched with a file at the edge so as to pass a current through the metal sheet of the DI can, and then the can was filled with an electrolytic solution (1% NaCl solution, 25° C.) to the edge. Thereafter, a voltage of 6 V was applied between the can body and electrolytic solution, and the current value was measured and rated as follows.

(Rating)
More than 1 mA: x
More than 0.1 mA and 1 mA or less: Δ
More than 0.01 mA and 0.1 mA or less: ○
0.01 mA or less: ⊙

(3) Retort Resistance

The retort resistance was examined as follows. A DI can after washing and drying was subjected to trimming and flanging, filled with tap water to the edge, and a cap end was clamped to the body. The can packed with tap water was treated with commercial retort equipment at 130° C. for 30 minutes, and the appearance of the outside of the can after the retort treatment was rated on the basis of the following criteria.

(Rating)
Whole film surface is obviously fogged: x
Film surface is partially fogged: Δ
Film surface is slightly fogged: ○
No change in appearance of film surface: ⊙

The results in Table 1 indicate that Examples 1 to 16 according to the present invention were superior in the formability, corrosion resistance, and retort resistance.

On the other hand, Comparative Examples 17 to 22 were inferior in formability, corrosion resistance, or retort resistance.

TABLE 1

| Steel sheet Sample No | Polyester resin composition | | | | | Lamination method | Lamination temperature (° C.) | Film properties Inside | |
|---|---|---|---|---|---|---|---|---|---|
| | Inside | | Outside | | | | | Crystallization temperature (° C.) | Plane orientation factor |
| | Resin composition | Melting point (° C.) | Resin composition | Melting point (° C.) | | | | | |
| 1 | Polyethylene terephthalate copolymerized with 3% isophthalic acid | 248 | Polybutylene terephthalate 60%/polyethylene terephthalate 40% mixture | 245 | Film thermocompression bonding 2 | 239 | 122 | 0.05 |
| 2 | Polyethylene terephthalate copolymerized with 12% isophthalic acid | 226 | Polybutylene terephthalate 60%/polyethylene terephthalate 40% mixture | 245 | Film thermocompression bonding 1 | 255 | 148 | <0.01 |
| 3 | Polyethylene terephthalate copolymerized with 12% isophthalic acid | 226 | Polybutylene terephthalate 60%/polyethylene terephthalate 40% mixture | 245 | Film thermocompression bonding 1 | 250 | 147 | <0.01 |
| 4 | Polyethylene terephthalate copolymerized with 12% isophthalic acid | 226 | Polybutylene terephthalate 60%/polyethylene terephthalate 40% mixture | 245 | Film thermocompression bonding 1 | 246 | 145 | <0.01 |
| 5 | Polyethylene terephthalate copolymerized with 12% isophthalic acid | 226 | Polybutylene terephthalate 60%/polyethylene terephthalate 40% mixture | 245 | Film thermocompression bonding 1 | 243 | 145 | <0.01 |
| 6 | Polyethylene terephthalate copolymerized with 12% isophthalic acid | 226 | Polybutylene terephthalate 60%/polyethylene terephthalate 40% mixture | 245 | Film thermocompression bonding 1 | 243 | 145 | <0.01 |
| 7 | Polyethylene terephthalate copolymerized with 12% isophthalic acid | 226 | Polybutylene terephthalate 60%/polyethylene terephthalate 40% mixture | 245 | Film thermocompression bonding 1 | 241 | 145 | <0.01 |
| 8 | Polyethylene terephthalate copolymerized with 12% isophthalic acid | 226 | Polybutylene terephthalate 60%/polyethylene terephthalate 40% mixture | 245 | Film thermocompression bonding 1 | 238 | 144 | <0.01 |
| 9 | Polyethylene terephthalate copolymerized with 12% isophthalic acid | 226 | Polybutylene terephthalate 60%/polyethylene terephthalate 40% mixture | 245 | Direct extrusion | 240 | 152 | <0.01 |
| 10 | Polyethylene terephthalate copolymerized with 12% isophthalic acid | 226 | Polybutylene terephthalate 75%/polyethylene terephthalate 25% mixture | 242 | Film thermocompression bonding 1 | 245 | 145 | <0.01 |
| 11 | Polyethylene terephthalate copolymerized with 12% isophthalic acid | 226 | Polybutylene terephthalate 45%/polyethylene terephthalate 55% mixture | 248 | Film thermocompression bonding 1 | 250 | 144 | <0.01 |
| 12 | Polyethylene terephthalate copolymerized with 18% isophthalic acid | 215 | Polybutylene terephthalate 60%/polyethylene terephthalate 40% mixture | 245 | Film thermocompression bonding 1 | 246 | 148 | <0.01 |
| 13 | Polyethylene terephthalate copolymerized with 5% isophthalic acid | 240 | Polybutylene terephthalate 60%/polyethylene terephthalate 40% mixture | 245 | Film thermocompression bonding 1 | 246 | 125 | <0.01 |
| 14 | Polyethylene terephthalate copolymerized with 5% cyclohexanedimethanol | 245 | Polybutylene terephthalate 60%/polyethylene terephthalate 40% mixture | 245 | Film thermocompression bonding 1 | 250 | 130 | <0.01 |

TABLE 1-continued

| | | | | | | | |
|---|---|---|---|---|---|---|---|
| 15 | Polyethylene terephthalate copolymerized with 12% isophthalic acid | 226 | Polybutylene terephthalate 60%/polyethylene terephthalate 40% mixture | 245 | Film thermocompression bonding 1 | 260 | 151 | <0.01 |
| 16 | Polybutylene terephthalate 60%/polyethylene terephthalate 40% mixture | 245 | Polybutylene terephthalate 60%/polyethylene terephthalate 40% mixture | 245 | Film thermocompression bonding 1 | 250 | 70 | <0.01 |
| 17 | Polyethylene terephthalate copolymerized with 12% isophthalic acid | 226 | Polyethylene telephthalate copolymerized with 12% isophthalic acid | 226 | Film thermocompression bonding 2 | 228 | 136 | <0.01 |
| 18 | Polyethylene terephthalate copolymerized with 12% isophthalic acid | 226 | Polybutylene terephthalate 90%/polyethylene terephthalate 10% mixture | 240 | Film thermocompression bonding 2 | 225 | 146 | <0.01 |
| 19 | Polyethylene terephthalate copolymerized with 12% isophthalic acid | 226 | Polybutylene terephthalate 30%/polyethylene terephthalate 70% mixture | 250 | Film thermocompression bonding 2 | 225 | 146 | <0.01 |
| 20 | Polyethylene terephthalate copolymerized with 12% isophthalic acid | 226 | Polybutylene terephthalate 60%/polyethylene terephthalate 40% mixture | 245 | Film thermocompression bonding 1 | 235 | 148 | <0.01 |
| 21 | Polyethylene terephthalate copolymerized with 12% isophthalic acid | 226 | Polybutylene terephthalate 60%/polyethylene terephthalate 40% mixture | 245 | Film thermocompression bonding 2 | 220 | 145 | <0.01 |
| 22 | Polyethylene terephthalate copolymerized with 12% isophthalic acid | 226 | Polybutylene terephthalate 60%/polyethylene terephthalate 40% mixture | 245 | Film thermocompression bonding 1 | 265 | 155 | <0.01 |

| Steel sheet Sample No | Film properties | | | | | | Heat treatment after DI forming | Rating after DI forming | | | Note |
|---|---|---|---|---|---|---|---|---|---|---|---|
| | Inside | | Outside | | | | | Outside Formability | Inside Corrosion resistance | Outside Retort resistance | |
| | Surface roughness (Ra) | 60 degree gloss | Crystallization temperature (°C.) | Plane orientation factor | Surface roughness (Ra) | 60 degree gloss | | | | | |
| 1 | 0.12 | 120 | 69 | 0.02 | 0.25 | 95 | 210° C. 30 seconds | ◯ | ◯ | ⊙ | Example |
| 2 | 1.2 | 40 | 70 | <0.01 | 0.81 | 52 | 210° C. 30 seconds | ⊙ | ⊙ | ⊙ | Example |
| 3 | 1.2 | 40 | 70 | <0.01 | 0.76 | 54 | 210° C. 30 seconds | ⊙ | ⊙ | ⊙ | Example |
| 4 | 1.2 | 42 | 70 | <0.01 | 0.72 | 55 | 210° C. 30 seconds | ⊙ | ⊙ | ⊙ | Example |
| 5 | 1.1 | 44 | 70 | <0.01 | 0.48 | 68 | 210° C. 30 seconds | ⊙ | ⊙ | ⊙ | Example |
| 6 | 1.1 | 44 | 70 | <0.01 | 0.48 | 68 | 120° C. 30 seconds | ⊙ | ⊙ | ◯ | Example |
| 7 | 1.1 | 43 | 70 | 0.01 | 0.32 | 93 | 210° C. 30 seconds | ◯ | ⊙ | ⊙ | Example |
| 8 | 1.1 | 44 | 69 | 0.03 | 0.23 | 97 | 210° C. 30 seconds | ◯ | ⊙ | ⊙ | Example |
| 9 | 0.85 | 48 | 69 | <0.01 | 0.88 | 45 | 210° C. 30 seconds | ◯ | ⊙ | ⊙ | Example |
| 10 | 1.2 | 42 | 60 | <0.01 | 0.72 | 55 | 210° C. 30 seconds | ⊙ | ⊙ | ⊙ | Example |
| 11 | 1.1 | 44 | 95 | <0.01 | 0.35 | 88 | 210° C. 30 seconds | ◯ | ⊙ | ⊙ | Example |
| 12 | 1.2 | 40 | 70 | <0.01 | 0.72 | 55 | 210° C. 30 seconds | ⊙ | ⊙ | ◯ | Example |
| 13 | 0.76 | 54 | 70 | <0.01 | 0.72 | 55 | 210° C. 30 seconds | ⊙ | ⊙ | ⊙ | Example |
| 14 | 0.65 | 60 | 70 | <0.01 | 0.76 | 54 | 210° C. 30 seconds | ⊙ | ⊙ | ⊙ | Example |
| 15 | 1.7 | 25 | 69 | <0.01 | 1.4 | 30 | 210° C. 30 seconds | ◯ | ⊙ | ⊙ | Example |

TABLE 1-continued

| 16 | 0.81 | 52 | 70 | <0.01 | 0.76 | 54 | 210° C. 30 seconds | ⊙ | ○ | ⊙ | Example |
| 17 | 0.72 | 55 | 136 | <0.01 | 0.72 | 55 | 210° C. 30 seconds | ⊙ | ⊙ | X | Comparative Example |
| 18 | 0.32 | 92 | 50 | <0.01 | 0.55 | 62 | 210° C. 30 seconds | X | ⊙ | ⊙ | Comparative Example |
| 19 | 0.32 | 93 | 110 | <0.01 | 0.35 | 88 | 210° C. 30 seconds | ○ | ⊙ | Δ | Comparative Example |
| 20 | 0.81 | 52 | 69 | 0.05 | 0.11 | 123 | 210° C. 30 seconds | X | ⊙ | ⊙ | Comparative Example |
| 21 | 0.23 | 95 | 70 | <0.01 | 0.14 | 115 | 210° C. 30 seconds | Δ | ○ | ⊙ | Comparative Example |
| 22 | 2.2 | 20 | 69 | <0.01 | 1.9 | 25 | 210° C. 30 seconds | X | ○ | ⊙ | Comparative Example |

INDUSTRIAL APPLICABILITY

A highly processed two-piece can body made of the laminated metal sheet of the present invention endures harsh conditions such as retort treatment without causing peeling or rupture of the resin layer. Accordingly, the present invention is suitable for, for example, food cans.

The invention claimed is:

1. A laminated metal sheet for a two-piece can body, comprising:
a metal sheet having a first polyester resin film layer on a first side of the metal sheet and a second polyester resin film layer on a second side of the metal sheet, the first polyester resin film layer to be an outside of the can body having a crystallization temperature of 60 to 100° C., and a surface of the first polyester resin film layer having a center line surface roughness (Ra) of 0.2 to 1.8 μm, wherein the first polyester resin film layer to be the outside of the can body is composed of 40 to 100% by mass of a resin composed mainly of butylene terephthalate and 0 to 60% by mass of a resin composed mainly of ethylene terephthalate.

2. The laminated metal sheet for a two-piece can body according to claim 1, wherein the first polyester resin film layer to be the outside of the can body is composed of 40 to 80% by mass of a resin composed mainly of butylene terephthalate and 20 to 60% by mass of a resin composed mainly of ethylene terephthalate.

3. The laminated metal sheet for a two-piece can body according to claim 1, wherein a film layer surface of the second polyester resin film to be an inside of the can body has a center line surface roughness (Ra) of 0.2 to 1.8 μm.

4. The laminated metal sheet for a two-piece can body according to claim 2, wherein a film layer surface of the second polyester resin film to be an inside of the can body has a center line surface roughness (Ra) of 0.2 to 1.8 μm.

5. The laminated metal sheet for a two-piece can body according to claim 2, which is produced through drawing and ironing.

6. The laminated metal sheet for a two-piece can body according to claim 3, which is produced through drawing and ironing.

7. The laminated metal sheet for a two-piece can body according to claim 4, which is produced through drawing and ironing.

8. The laminated metal sheet for a two-piece can body according to claim 1, wherein the surface of the first polyester resin film layer has a 60 degree glossiness of 30 to 100.

9. The laminated metal sheet for a two-piece can body according to claim 1, wherein the surface of the first polyester resin film layer has a 60 degree glossiness of 50 to 100.

10. The laminated metal sheet for a two-piece can body according to claim 1, wherein a surface of the second polyester resin film layer has a 60 degree glossiness of 30 to 100.

11. The laminated metal sheet for a two-piece can body according to claim 1, wherein a surface of the second polyester resin film layer has a 60 degree glossiness of 50 to 100.

12. The laminated metal sheet for a two-piece can body according to claim 1, wherein the first polyester resin film layer contains 5 to 15 mol % of a copolymerization component.

13. The laminated metal sheet for a two-piece can body according to claim 1, wherein the second polyester resin film layer contains 5 to 15 mol % of a copolymerization component.

14. The laminated metal sheet for a two-piece can body according to claim 1, wherein the first polyester resin film layer has a biaxial orientation with a plane orientation factor of 0.04 or less.

15. The laminated metal sheet for a two-piece can body according to claim 1, wherein the second polyester resin film layer has a biaxial orientation with a plane orientation factor of 0.04 or less.

16. A two-piece can body, comprising:
a laminated metal sheet;
a first polyester resin film layer on a first side of the laminated metal sheet, the first polyester resin film layer forming an outside of the can body, the first polyester resin film having a crystallization temperature of 60 to 100° C., a surface of the first polyester resin film layer having a center line surface roughness (Ra) of 0.2 to 1.8 μm; and
a second polyester resin film on a second side of the laminated metal sheet, wherein the first polyester resin film layer to be the outside of the can body is composed of 40 to 100% by mass of a resin composed mainly of butylene terephthalate and to 60% by mass of a resin composed mainly of ethylene terephthalate.

* * * * *